US011882301B2

(12) United States Patent
Zhao et al.

(10) Patent No.: US 11,882,301 B2
(45) Date of Patent: *Jan. 23, 2024

(54) MODIFIED QUANTIZER

(71) Applicant: TENCENT AMERICA LLC, Palo Alto, CA (US)

(72) Inventors: Xin Zhao, Santa Clara, CA (US); Madhu Peringassery Krishnan, Mountain View, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,849

(22) Filed: Jun. 10, 2022

(65) Prior Publication Data

US 2022/0303563 A1 Sep. 22, 2022

Related U.S. Application Data

(63) Continuation of application No. 17/077,471, filed on Oct. 22, 2020, now Pat. No. 11,381,830.

(Continued)

(51) Int. Cl.
*H04N 19/00* (2014.01)
*H04N 19/44* (2014.01)
(Continued)

(52) U.S. Cl.
CPC ............ *H04N 19/44* (2014.11); *G06F 1/03* (2013.01); *H04N 19/124* (2014.11); *H04N 19/184* (2014.11); *H04N 19/70* (2014.11)

(58) Field of Classification Search
CPC .... H04N 19/44; H04N 19/124; H04N 19/184; H04N 19/70; G06F 1/03
See application file for complete search history.

(56) References Cited

U.S. PATENT DOCUMENTS 10,432,929 B2  10/2019  Zhao et al.
2010/0020872 A1* 1/2010 Shimizu ............... H04N 19/196
375/E7.243

(Continued)

FOREIGN PATENT DOCUMENTS

EP  3618440 A1  3/2020
KR  10-2015-0003246 A  1/2015
WO  2013/152007 A1  10/2013

OTHER PUBLICATIONS

Extended European Search Report dated Sep. 26, 2020 in European Application No. 20940004.3.

(Continued)

*Primary Examiner* — Zhihan Zhou
(74) *Attorney, Agent, or Firm* — Sughrue Mion, PLLC

(57) ABSTRACT

A method, computer program, and computer system is encoding or decoding video data. Video data may include a syntax element indicating a quantization index, wherein a range of the quantization index is extended by an offset value. The syntax element may be parsed to determine the quantization index, a quantization step size may be obtained from a lookup table based on the quantization index and the offset value; and the video data may be encoded or decoded based on the quantization step size.

20 Claims, 9 Drawing Sheets

Related U.S. Application Data

(60) Provisional application No. 63/038,010, filed on Jun. 11, 2020.

(51) Int. Cl.
  H04N 19/124 (2014.01)
  G06F 1/03 (2006.01)
  H04N 19/184 (2014.01)
  H04N 19/70 (2014.01)

(56) References Cited

U.S. PATENT DOCUMENTS

| | | | |
|---|---|---|---|
| 2011/0255595 A1 | 10/2011 | Zuo et al. | |
| 2013/0266078 A1* | 10/2013 | Deligiannis | H04N 19/152 |
| | | | 375/240.25 |
| 2014/0376619 A1* | 12/2014 | Tourapis | H04N 19/86 |
| | | | 375/240.03 |
| 2016/0316206 A1* | 10/2016 | Sullivan | H04N 19/186 |
| 2017/0318301 A1* | 11/2017 | Li | H04N 19/70 |
| 2019/0020875 A1 | 1/2019 | Liu et al. | |
| 2020/0092557 A1 | 3/2020 | Sullivan et al. | |

OTHER PUBLICATIONS

Bross et al., Joint Video Experts Team (JVET) of ITU-T SG 16 WP 3 and ISO/IEC JTC 1/SC 29/WG 11, 12th Meeting: Macao, CN, Oct. 3-12, 2018, JVET-L0285-r1 (7 pages total).

Bross et al., Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2001-vE (455 pages total).

Chang et al., "Intra prediction using multiple reference lines for the versatile video coding standard", Proc. SPIE 11137, Applications of Digital Image Processing XLII, 1113716 (Sep. 6, 2019) (8 pages total).

Chen et al., "Screen Content Coding Using Non-Square Intra Block Copy for HEVC", 2014 IEEE International Conference on Multimedia and Expo (ICME), Chengdu, 2014, pp. 1-6 (6 pages total).

De Rivaz et al., "AV1 Bitstream & Decoding Process Specification", Version 1.0.0 with Errata 1, 2018, The Alliance for Open Media (681 pages total).

Guo et al., "Inter-layer Adaptive Filtering for Scalable Extension of HEVC", 2013 Picture Coding Symposium (PCS), San Jose, CA, 2013, pp. 165-168 (4 pages total).

Guo et al., "Inter-layer Intra Mode Prediction for Scalable Extension of HEVC", 2013 Picture Coding Symposium (PCS), San Jose, CA, 2013, pp. 317-320 (4 pages total).

Lai et al., "Combined Temporal and Inter-layer Prediction for Scalable Video Coding using HEVC", 2013 Picture Coding Symposium (PCS), San Jose, CA, 2013, pp. 117-120 (4 pages.

Lai et al., "Low Latency Directional Filtering for Inter-layer Prediction in Scalable Video Coding using HEVC", 2013 Picture Coding Symposium (PCS), San Jose, CA, 2013, pp. 269-272 (4 pages total).

Liu et al., "Bit Allocation for Video Coding with Temporal-Spatial Tradeoff", Advances in Multimedia Information Processing—PCM 2001. PCM 2001. Lecture Notes in Computer Science, vol. 2195. Springer, Berlin, Heidelberg, pp. 466-473 (10 pages total).

Liu et al., "Bit-depth Scalable Coding for High Dynamic Range Video", Proc. SPIE 6822, Visual Communications and Image Processing 2008, 68220O (Jan. 28, 2008) (12 pages total).

Liu et al., "Complexity Reduction of Joint Temporal-Spatial Bit Allocation Using R-D Models for Video Streaming", IEEE ICIP 2002, pp. 729-732 (4 pages total).

Bross et al., Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001-v6 (141 pages total).

Bross et al., "General Video Coding Technology in Responses to the Joint Call for Proposals on Video Compression with Capability beyond HEVC", IEEE Transactions on Circuits and Systems for Video Technology, 2019, pp. 1-16 (16 pages total).

Liu et al., "Efficient MPEG-2 to MPEG-4 Video Transcoding", Proc. SPIE 5022, Image and Video Communications and Processing 2003, (May 7, 2003), pp. 186-195 (10 pages total).

Liu et al., "Joint Temporal-Spatial Bit Allocation for Video Coding With Dependency", IEEE Transactions on Circuits and Systems for Video Technology, vol. 15, No. 1, Jan. 2005, pp. 15-26 (12 pages total).

Liu et al., "Joint Temporal-Spatial Rate Control for Adaptive Video Transcoding", 2003 International Conference on Multimedia and Expo. ICME '03. Proceedings (Cat. No. 03TH8698), Baltimore, MD, USA, 2003, pp. II-225 (4 pages total).

Liu et al., "Joint Temporal-Spatial Rate Control with Approximating Rate-Distortion Models", Proceedings of SPIE—The International Society for Optical Engineering 4671:746-755 (10 pages total).

Liu et al., "MCI-embedded motion-compensated prediction for quality enhancement of frame interpolation", Proc. SPIE 4209, Multimedia Systems and Applications III, (Mar. 22, 2001), pp. 251-261 (12 pages total).

Liu et al., "MPEG Video Transcoding with Joint Temporal-Spatial Rate Control", Proc. SPIE 4790, Applications of Digital Image Processing XXV, (Nov. 21, 2002), pp. 278-289 (13 pages total).

Liu et al., "Nonlinear motion-compensated interpolation for low-bit-rate video", Proc. SPIE 4115, Applications of Digital Image Processing XXIII, (Dec. 28, 2000), pp. 203-213 (12 pages total).

Liu et al., "Rectangular Partitioning for Intra Prediction in HEVC", 2012 Visual Communications and Image Processing, San Diego, CA, 2012, pp. 1-6 (6 pages total).

Liu et al., "Video Prediction Block Structure and the Emerging High Efficiency Video Coding Standard", Proceedings of the 2012 Asia Pacific Signal and Information Processing Association Annual Summit and Conference, Hollywood, CA, 2012, pp. 1-4 (4 pages total).

Lou et al., "Complexity and Memory Efficient GOP Structures Supporting VCR Functionalities in H.264/AVC", 2008 IEEE International Symposium on Circuits and Systems, Seattle, WA, 2008, pp. 636-639 (4 pages total).

Lou et al., "Trick-Play Optimization for H.264 Video Decoding", Journal of Information Hiding and Multimedia Signal Processing, 2009, pp. 1-13 (15 pages total).

Pu et al., "Palette Mode Coding in HEVC Screen Content Coding Extension", IEEE Journal on Emerging and Selected Topics in Circuits and Systems, vol. 6, No. 4, Dec. 2016, pp. 420-432 (13 pages total).

Racape et al., Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0500_r1-r4, (45 pages total).

Sun et al., "Improved Palette Index Map Coding on HEVC SCC", 2016 IEEE International Conference on Image Processing (ICIP), Phoenix, AZ, 2016, pp. 4210-4214 (5 pages total).

Sun et al., "Palette Mode—A New Coding Tool in Screen Content Coding Extensions of HEVC", 2015 IEEE International Conference on Image Processing (ICIP), Quebec City, QC, 2015, pp. 2409-2413 (5 pages total).

Xu et al., "Block Vector Prediction in Intra Block Copy for HEVC Screen Content Coding", 2015 Data Compression Conference, Snowbird, UT, 2015, pp. 273-282 (10 pages total).

Xu et al., "Intra Block Copy in HEVC Screen Content Coding Extensions", IEEE Journal on Emerging and Selected Topics in Circuits and Systems, vol. 6, No. 4, pp. 409-419, Dec. 2016 (11 pages total).

Xu et al., "PU Level Intra Block Copying with Flipping Mode", Signal and Information Processing Association Annual Summit and Conference (APSIPA), 2014 Asia-Pacific, Siem Reap, 2014, pp. 1-7 (7 pages total).

Zhang et al., "Fast Adaptive Multiple Transform for Versatile Video Coding", 2019 Data Compression Conference, IEEE, pp. 63-72 (10 pages total).

Zhang et al., "Fast DST-7/DCT-8 with Dual Implementation Support for Versatile Video Coding", IEEE Transactions on Circuits and Systems for Video Technology, 2020 IEEE, pp. 1-17 (17 pages total).

(56) References Cited

OTHER PUBLICATIONS

Zhang et al., "Intra Mode Coding in HEVC Standard", 2012 Visual Communications and Image Processing, San Diego, CA, 2012, pp. 1-6 (6 pages total).
Zhang et al., "Novel Statistical Modeling, Analysis and Implementation of Rate-Distortion Estimation for H.264/AVC Coders", IEEE Transactions on Circuits and Systems for Video Technology, vol. 20, No. 5, May 2010, pp. 647-660 (14 pages total).
Zhao et al., "Coupled Primary and Secondary Transform for Next Generation Video Coding", 2018 IEEE Visual Communications and Image Processing (VCIP), Taichung, Taiwan, 2018, pp. 1-4 (4 pages total).
Zhao et al., "Joint Separable and Non-Separable Transforms for Next-Generation Video Coding", IEEE Transactions on Image Processing, vol. 27, No. 5, pp. 2514-2525, May 2018 (13 pages total).
Zhao et al., Joint Video Experts Team (JVET) of ITU-T SG 16 WP 3 and ISO/IEC JTC 1/SC 29/WG 11, 12th Meeting: Macao, CN, Oct. 3-12, 2018, JVET-L0285-r1 (18 pages total).
Zhao et al., Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0545-v2 (6 pages total).
Zhao et al., "Low-Complexity Intra Prediction Refinements for Video Coding", 2018 Picture Coding Symposium (PCS), San Francisco, CA, 2018, pp. 139-143 (5 pages total).
Zhao et al., "NSST: Non-Separable Secondary Transforms for Next Generation Video Coding", 2016 Picture Coding Symposium (PCS), Nuremberg, 2016, pp. 1-5 (5 pages total).
Zhao et al., "Wide Angular Intra Prediction for Versatile Video Coding", 2019 Data Compression Conference (DCC), Snowbird, UT, USA, 2019, pp. 53-62 (10 pages total).
Zhao et al., Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0497 (11 pages total).
Zhao et al., Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0394-r2 (25 pages total).
Zhao et al., Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0539-v2 (19 pages total).
Liu et al., "Global/Local Motion-Compensated Frame Interpolation for Low Bitrate Video", Apr. 2000, Proceedings of SPIE—The International Society for Optical Engineering 3974 (12 pages total).
Liu et al., "Hybrid global-local motion compensated frame interpolation for low bit rate video coding", J. Vis. Commun. Image R., vol. 14 (2003) pp. 61-79 (19 pages total).
Liu et al., "Improved Video Coding via Adaptive Selection of Generalized Motion Prediction Modes for B Frames", Picture Coding Symposium 2001, pp. 358-361 (4 pages total).
Written Opinion of the International Searching Authority dated Feb. 5, 2021 in International Application No. PCT/US2020/060743.
International Search Report dated Feb. 5, 2021 in International Application No. PCT/US2020/060743.
Japanese Office Action dated Aug. 15, 2023 in Japanese Application No. 2022-529283.
Bross et al., "High Efficiency Video Coding (HVEC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 2013, pp. 1-11 (11 pages total).
Korean Office Action dated Nov. 10, 2023 in Application No. 10-2022-7010975.

\* cited by examiner

MODIFIED QUANTIZER

CROSS-REFERENCE TO RELATED APPLICATION

This is a continuation of U.S. application Ser. No. 17/077,471 filed Oct. 22, 2020, which claims priority under 35 U.S.C. § 119 to U.S. Provisional Application No. 63/038,010, filed on Jun. 11, 2020, in the United States Patent & Trademark Office, the disclosure of which is incorporated herein by reference in its entirety.

FIELD

This disclosure relates generally to the field of data processing, and more particularly to video encoding and/or decoding.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. AOMedia Video 2 (AV2) is currently under development. In AV1, quantization step sizes have limited resolution.

SUMMARY

Embodiments relate to a method, system, and computer readable medium for encoding and/or decoding video data. According to one aspect, a method for encoding and/or decoding video data is provided. The method may include obtaining video data including a syntax element indicating a quantization index, wherein a range of the quantization index is extended by an offset value; parsing the syntax element to determine the quantization index; obtaining a quantization step size from a lookup table based on the quantization index and the offset value; and encoding or decoding the video data based on the quantization step size.

According to another aspect, a device for encoding and/or decoding video data is provided. The device may include at least one memory configured to store program code; and at least one processor configured to read the program code and operate as instructed by the program code, the program code including: first obtaining code configured to cause the at least one processor to obtain video data including a syntax element indicating a quantization index, wherein a range of the quantization index is extended by an offset value; parsing code configured to cause the at least one processor to parse the syntax element to determine the quantization index; second obtaining code configured to cause the at least one processor to obtain a quantization step size from a lookup table based on the quantization index and the offset value; and encoding code or decoding code configured to cause the at least one processor to encode or decode the video data based on the quantization step size.

According to another aspect, a non-transitory computer-readable medium for encoding and/or decoding video data is provided. The non-transitory computer-readable medium may include one or more instructions that, when executed by one or more processors of a device for video decoding, cause the one or more processors to: obtain video data including a syntax element indicating a quantization index, wherein a range of the quantization index is extended by an offset value; parse the syntax element to determine the quantization index; obtain a quantization step size from a lookup table based on the quantization index and the offset value; and decode the video data based on the quantization step size.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and/or decode video data using an extended quantizer for efficient compression of the video data. Therefore, some embodiments have the capacity to improve the field of computing by providing an extended quantizer in AV2.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Currently the AV1 quantization step sizes have limited resolution. Although the step size range has increased, the valid range of Q_index is the same. This limitation in quantization step resolution is more evident for 10-bit and 12-bit internal bit depth, where the corresponding 8-bit step size (obtained using the q_idx) is scaled by 4 and 16 respectively. This can affect the granularity of bit rates that can be achieved by the codec. It may be advantageous, therefore, to increase quantization step size resolution by extending a range of a quantization index.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
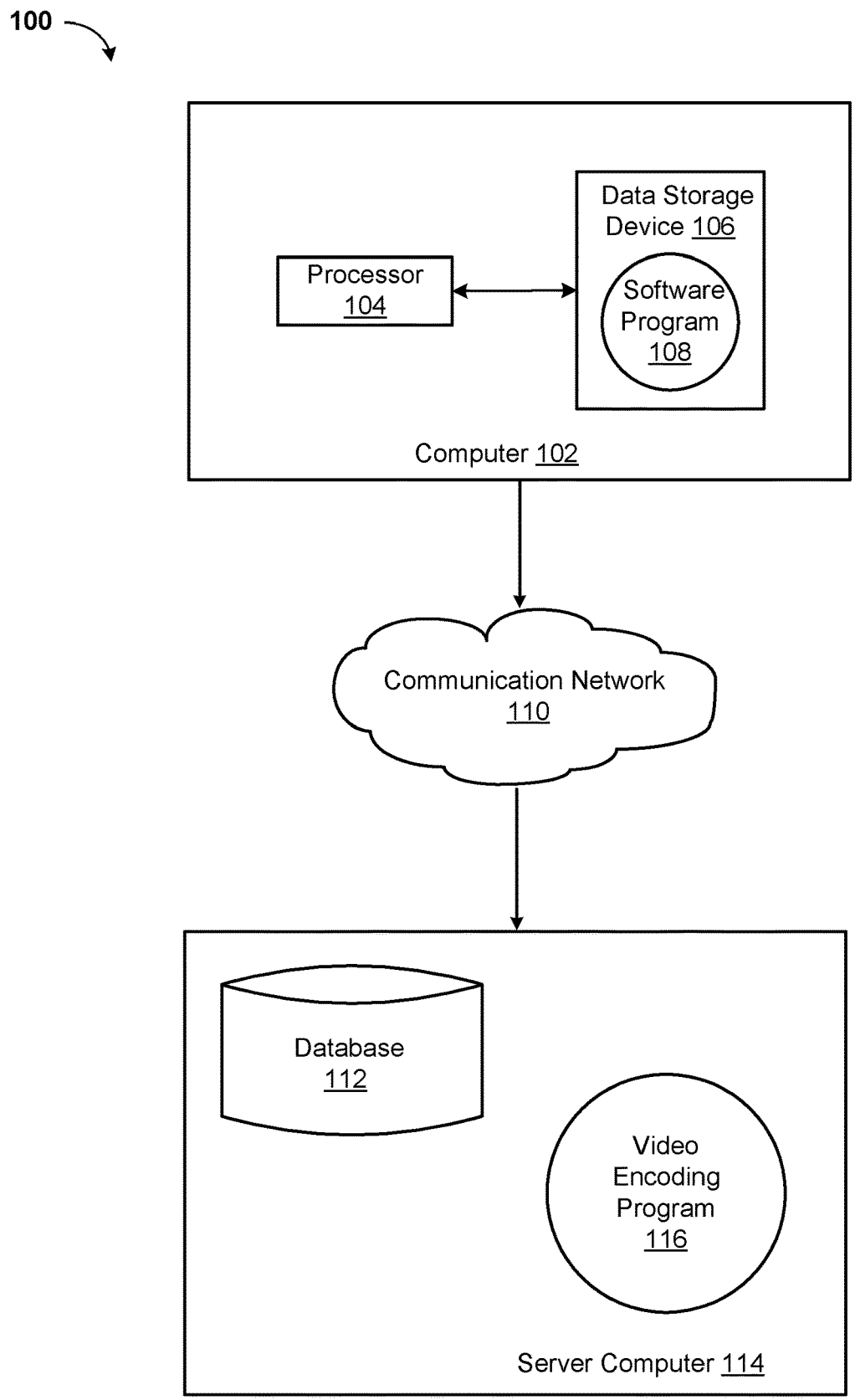
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data according to exemplary embodiments such as those described herein. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for encoding video data is enabled to run a Video Encoding Program 116 (hereinafter "program") that may interact with a database 112. The Video Encoding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

In AV1, quantization of transform coefficients may apply different quantization step size for DC and AC transform coefficients, and different quantization step size for luma and chroma transform coefficients. To specify the quantization step size, in the frame header, a base_q_idx syntax element may first be signaled, which may be an 8-bit fixed length code specifying the quantization step size for luma AC coefficients. The valid range of base_q_idx is [0, 255]. After that, the delta value relative to base_q_idx for Luma DC coefficients, indicated as DeltaQYDc is further signaled. Furthermore, if there are more than one color plane, then a flag diff_uv_delta may be signaled to indicate whether Cb and Cr color components apply different quantization index values. If diff_uv_delta is signaled as 0, then only the delta values relative to base_q_idx for chroma DC coefficients (indicated as DeltaQUDc) and AC coefficients (indicated as DeltaQUAc) may be signaled. Otherwise, the delta values relative to base_q_idx for both the Cb and Cr DC coefficients (indicated as DeltaQUDc and DeltaQVDc) and AC coefficients (indicated as DeltaQUAc and DeltaQVAc) are signaled.

Figure 2A:
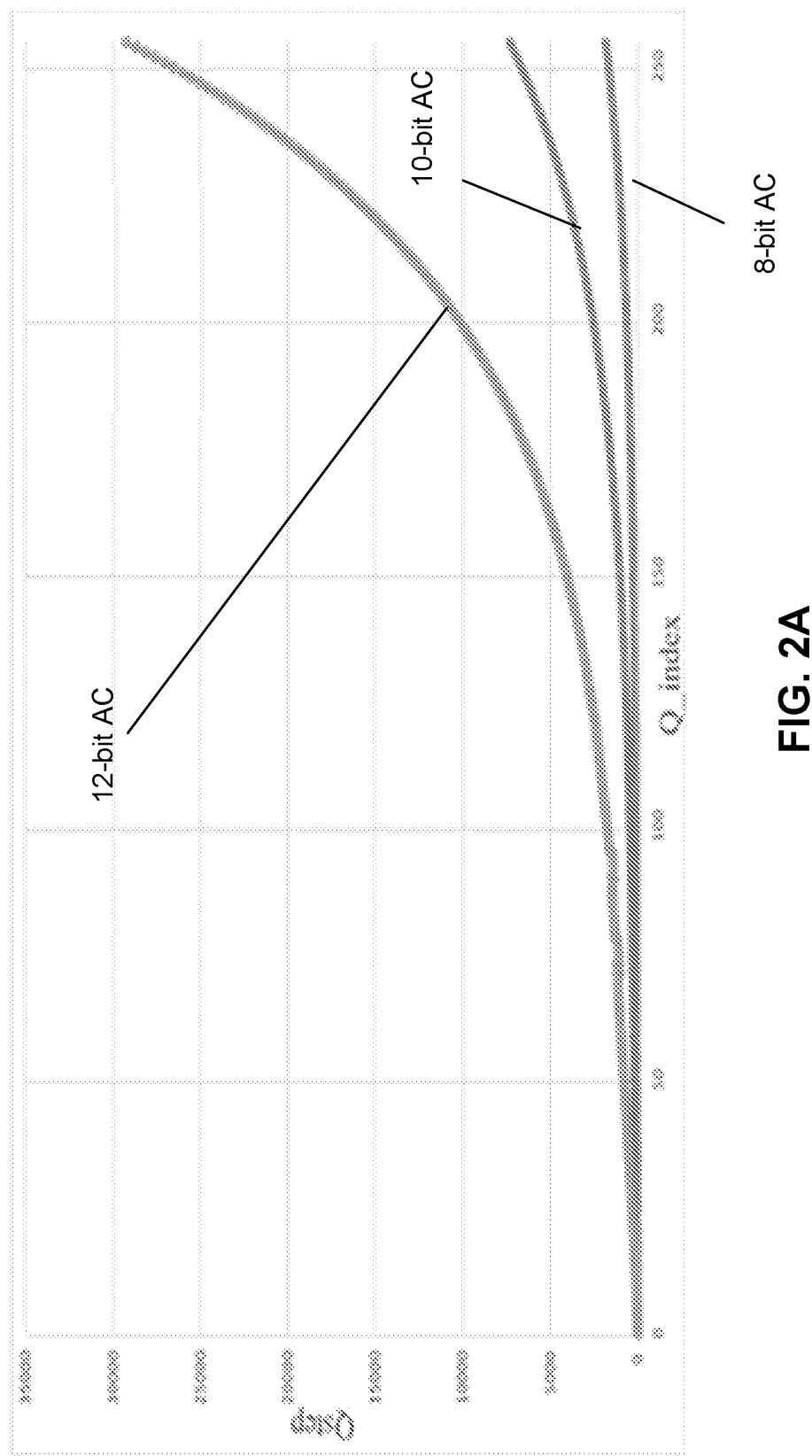
FIG. 2A illustrates an example of Q_index to Qstep mapping for AC coefficients according to at least one embodiment.
Figure 2B:
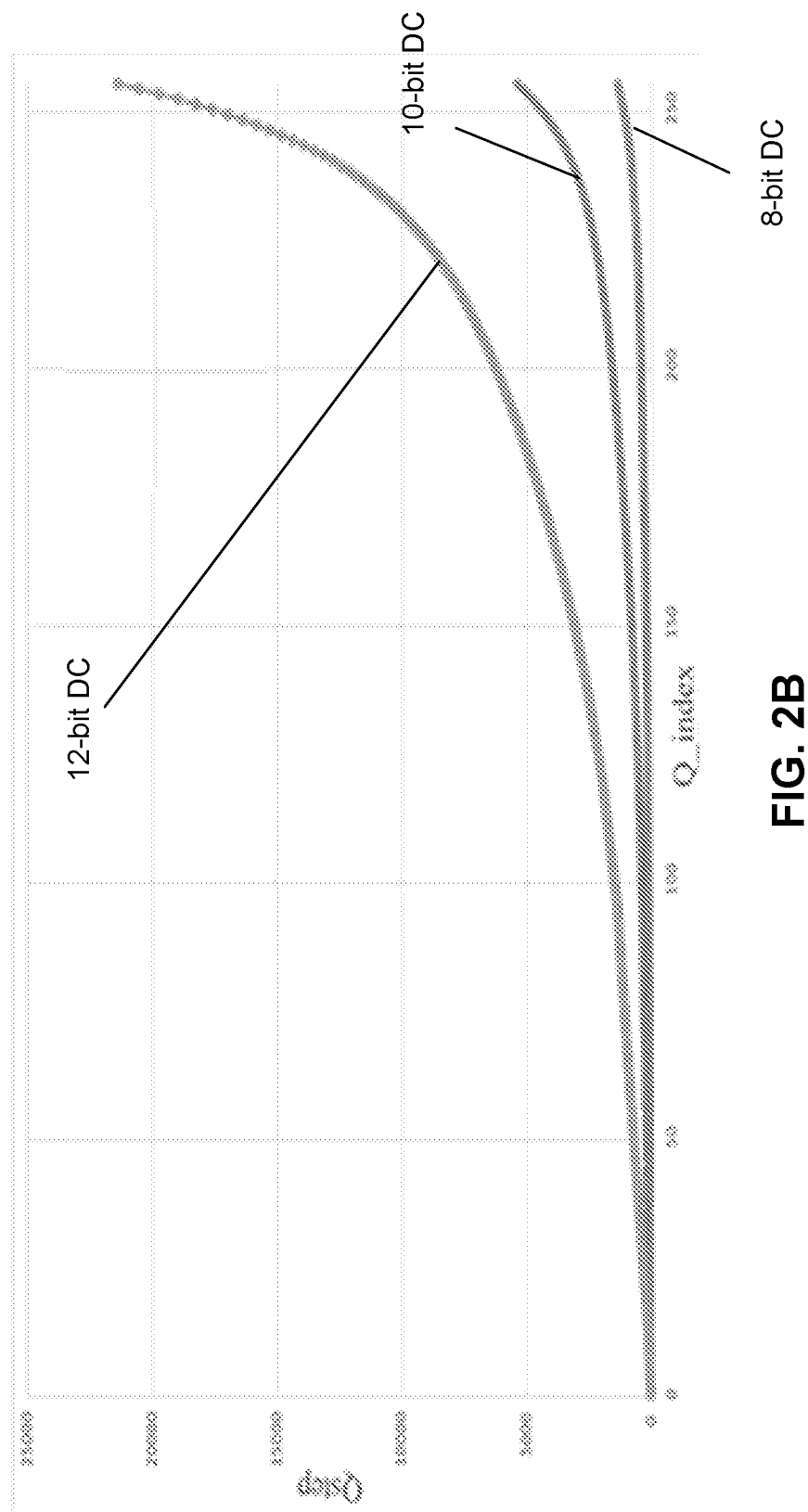
FIG. 2B illustrates an example of Q_index to Qstep mapping for DC coefficients according to at least one embodiment.

The above decoded DeltaQYDc, DeltaQUAc, DeltaQUDc, DeltaQVAc and DeltaQVDc may be added to base_q_idx to derive the quantization indices Q_index's. Then, these Q_index's may be further mapped to quantization step size according to two tables. For DC coefficients, the mapping from quantization index to quantization step size for 8-bit, 10-bit and 12-bit internal bit depth may be specified by a lookup table Dc_Qlookup[3][256], and the mapping from quantization index to quantization step size for 8-bit, 10-bit and 12-bit may be specified by a lookup table Ac_Qlookup[3][256]. An example of such a mapping for AC coefficients is illustrated in FIG. 2A, and an example of such a mapping for DC coefficients is illustrated in FIG. 2B.

In the ongoing AV2 development process, several tools may be used in the quantizer design.

Figure 3A:
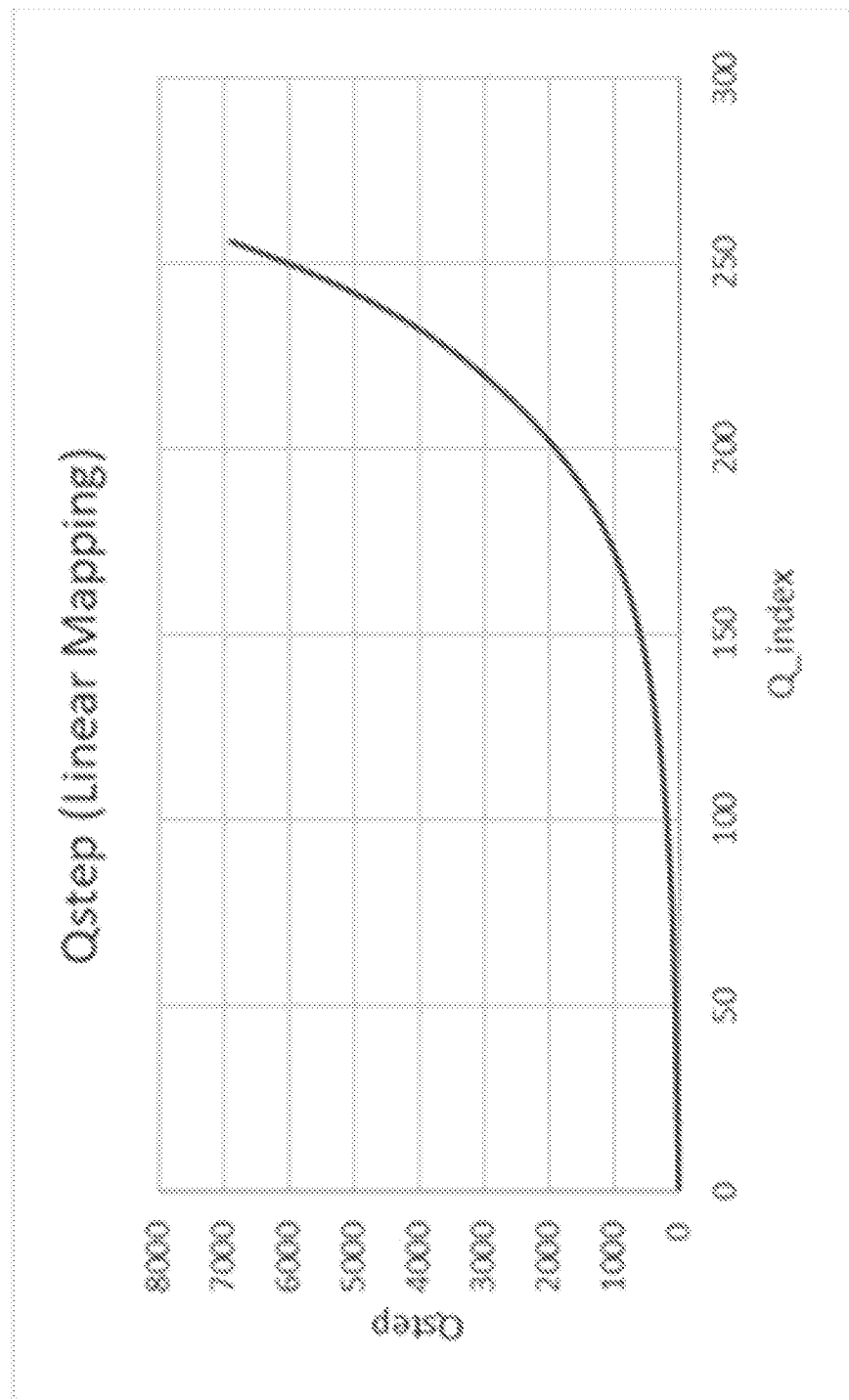
FIG. 3A illustrates a unified Q_index to Qstep Linear mapping proposed for AV2, according to at least one embodiment.

For example, a first method may include removing the separate look up tables Dc_Qlookup[3][256] and Ac_Qlookup[3][256]. In this example, only the Ac_Qlookup[3][256] illustrated in FIG. 3A is kept and the DC quantization step size are obtained using an offset from it. The default offset is set at 8.

In embodiments, separate look up tables may be used for obtaining quantizer step sizes for 8-bit, 10-bit and/or 12-bit internal bit depth and the step sizes did not exhibit any mathematical relation. As another example, a second method may include replacing this with a modified look up table for 8-bit internal bit depth. In this example, the quantization step size generation process is unified in such a way that for 10-bit and 12-bit internal bit depth, the corresponding 8-bit step size (obtained using the Q_index) is scaled by 4 and 16 respectively.

As another example, a second method may include increasing the range of step sizes supported without increase in range of Q_index.

As discussed above, currently the AV1 quantization step sizes have limited resolution. Although the step size range has increased, the valid range of Q_index is the same. As plotted in FIG. 3A, the valid range of Q_index is [0, 255] and these map to a step size range [4, 6879] (after changes discussed above). This limitation in quantization step resolution is more evident for 10-bit and 12-bit internal bit depth, where the corresponding 8-bit step size (obtained using the q_idx) is scaled by 4 and 16 respectively. This can affect the granularity of bit rates that can be achieved by the codec.

Figure 3B:
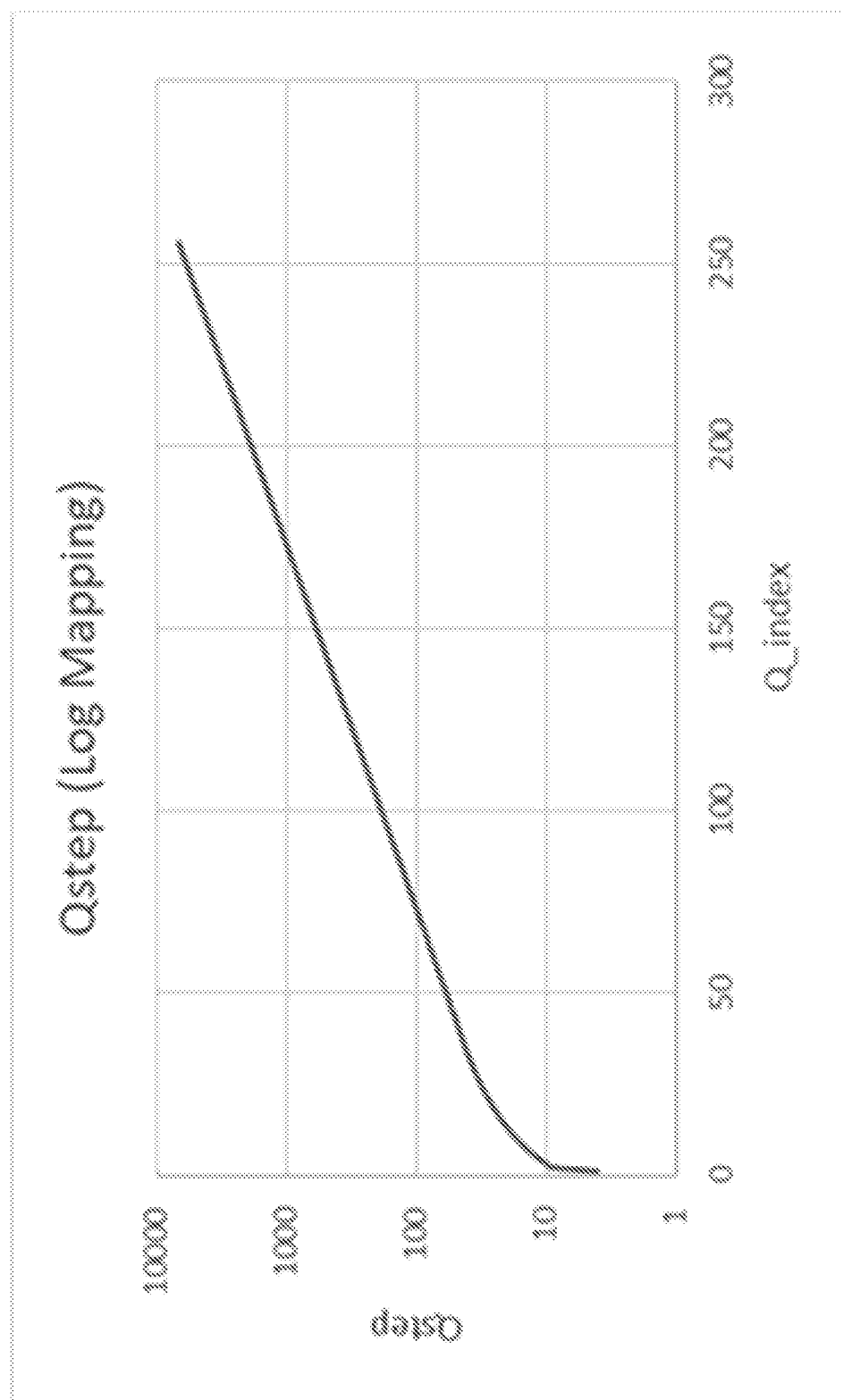
FIG. 3B illustrated a unified Q_index to Qstep Log 2 mapping proposed for AV2, according to at least one embodiment.

The mapping from Q_index to quantization step size does not exhibit a consistent mathematical relation. As plotted in FIG. 3B, the initial entries of the step size exhibit a linear relationship with the Q_index, while the rest of the mapping is mostly exponential. The switch from the linear mapping to exponential mapping is not smooth. Moreover, at lower Q_index there is a sudden jump in the step size, which will be more evident for 10-bit and 12-bit internal bit depth coding as those are scaled up by 4 and 16 respectively.

Exemplary embodiments may be used separately or combined in any order. In one or more embodiments, an exponential mapping of Q_index to Qstep can be represented as Equation 1 below:

$$Q\text{step} = a * b^{Q\_index/c} \quad \text{(Equation 1)}$$

In one or more embodiments, a linear mapping of Q_index to Qstep can be represented as Equation 2 below:

$$Q\text{step} = x * Q\_index + y \quad \text{(Equation 2)}$$

In Equations 1 and 2, a, b & c may be constants for some range of Q_index

In one or more embodiments, an offset may be added to the Q_index, wherein the offset depends on the internal bit depth value.

In one or more embodiments, the offset value is added in a way that after adding the offset value, the quantization step size may be scaled by power (2, bitdepth−8). For example, for bit depth 8, the quantization step size may be not modified. In another example, for bit depth not equal to 8, the quantization step size may be scaled by power (2, bitdepth−8).

In one or more embodiments, the offset value may be m*(bitdepth−8), where example values of m include but not limited to 1, 2, . . . , 30, 32.

In one or more embodiments, for the smaller quantization step size (Q_index or Qstep smaller than a given threshold Q0), the linear mapping may be applied, for the larger quantization step size (Q_index or Qstep is greater than a given threshold Q0), then while the offset value is proportional to c.

In one or more embodiments, when the Q_index is greater than or equal to a given threshold value, e.g., 256, an offset may be added to Q_index to derive the corresponding quantization step size, and the quantization step size is then scaled by power (2, bitdepth−8). For example, the offset may be the same as the offset value applied in above, but with negative sign. Example values of the absolute value of offset include, but are not limited to integer numbers between 6 and 65, e.g., 60, 64 for bit depth 10, and 120, 128 for bit depth 12.

In one or more embodiments the Q_index may be signaled as a 9-bit integer.

In one or more embodiments, the value of Q_index is restricted by the internal bit-depth value. For example, the Q_index may be restricted to be [0, 255+m*(bitdepth−8)], example values of m include but not limited to 1, 2, . . . , 30, 32.

In one or more embodiments, instead of signaling the value of Q_index directly, Q_index plus an offset may be signaled. For example, Q_index minus N, and Q_index minus N may be signaled as a signed syntax. In an example, the offset value N may be −128.

Figure 4:
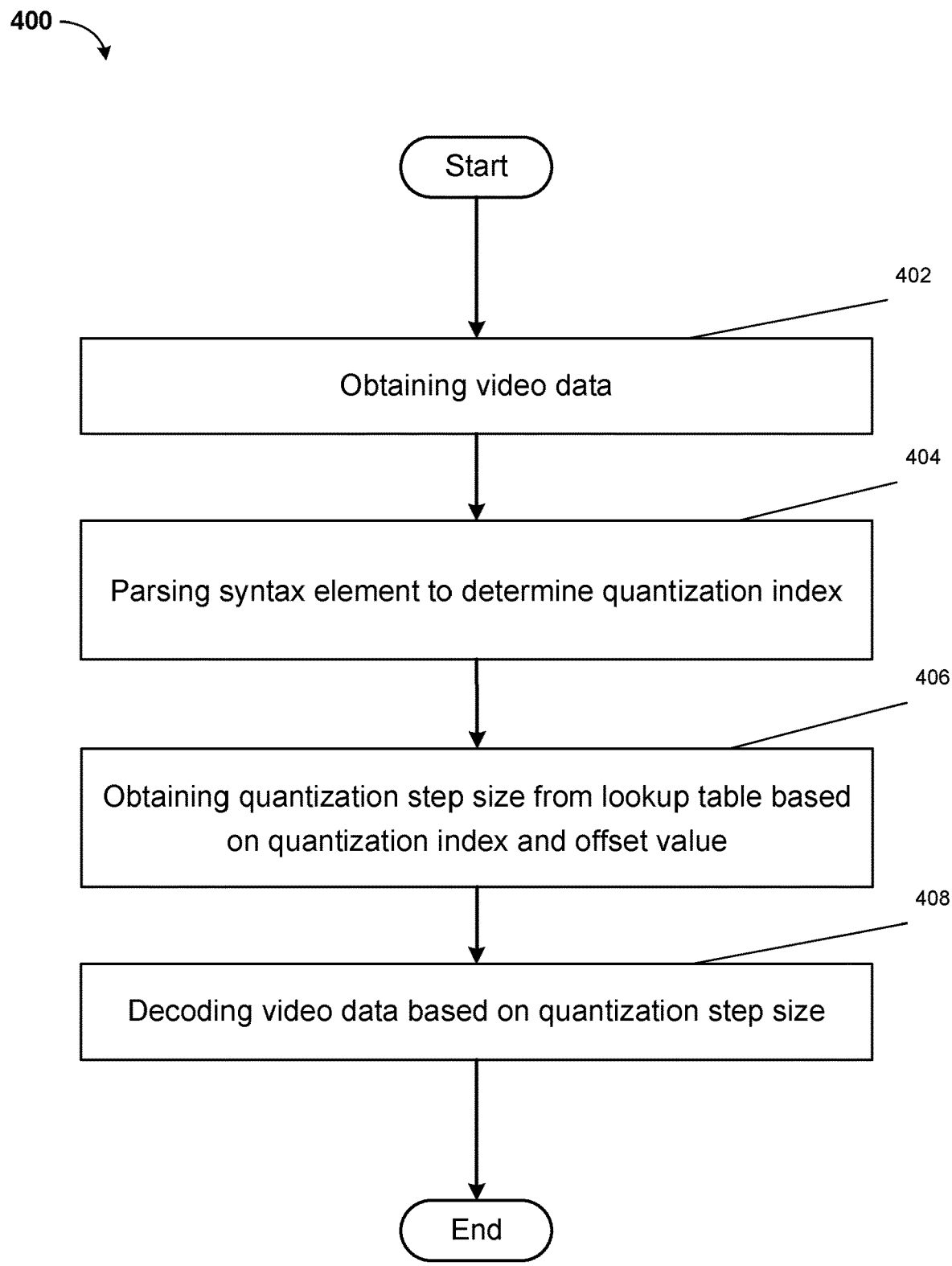
FIG. 4 is an operational flowchart illustrating the steps carried out by a program that codes video data, according to at least one embodiment.

Referring now to FIG. 4, an operational flowchart illustrating the steps of a method 300 for encoding and/or decoding video data is depicted. In some implementations, one or more process blocks of FIG. 4 may be performed by the computer 102 (FIG. 1) and the server computer 114 (FIG. 1). In some implementations, one or more process blocks of FIG. 4 may be performed by another device or a group of devices separate from or including the computer 102 and the server computer 114.

At 402, the method 400 includes obtaining video data including a syntax element indicating a quantization index. A range of the quantization index may be extended by an offset value.

At 404, the method 400 includes parsing the syntax element to determine the quantization index.

At 406, the method 400 includes obtaining a quantization step size from a lookup table based on the quantization index and the offset value.

At 408, the method 400 includes decoding the video data based on the quantization step size.

In one or more embodiments, the offset value may be determined based on an internal bit depth value of the video data.

In one or more embodiments, the quantization step size may be obtained from the lookup table based on a result of adding the offset value to the quantization index, if the quantization index is larger than a threshold value.

In one or more embodiments, the offset value may be a negative integer.

In one or more embodiments, the threshold value may be 255.

In one or more embodiments, the syntax element may include a 9-bit integer.

In one or more embodiments, a value of the 9-bit integer may be equal to a result of adding the offset value to the quantization index.

In one or more embodiments, a size of the lookup table may be 255 values of the quantization step size.

It may be appreciated that FIG. 4 provides only an illustration of one implementation and does not imply any limitations with regard to how different embodiments may be implemented. Many modifications to the depicted environments may be made based on design and implementation requirements.

Figure 5:
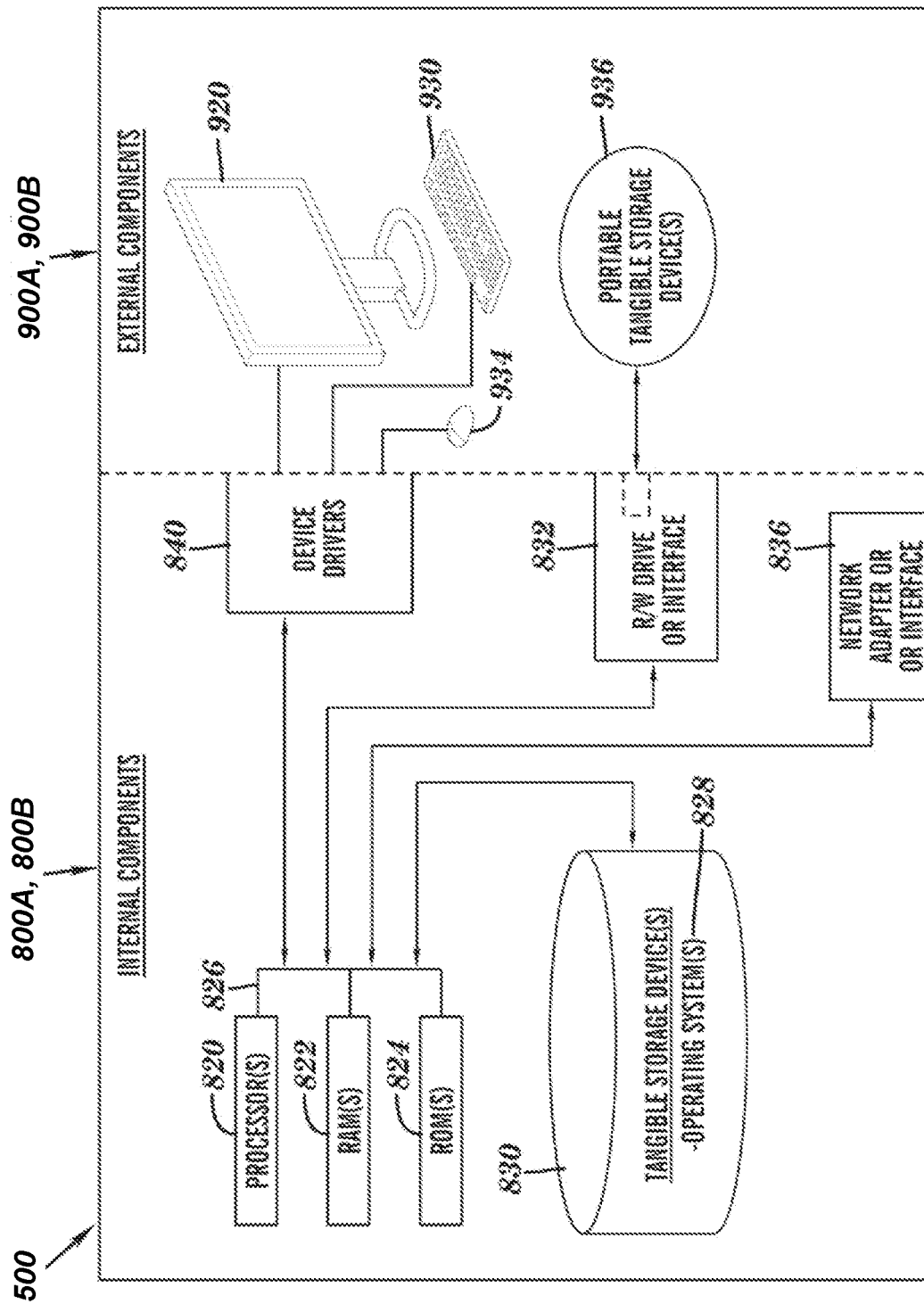
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMS 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Encoding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
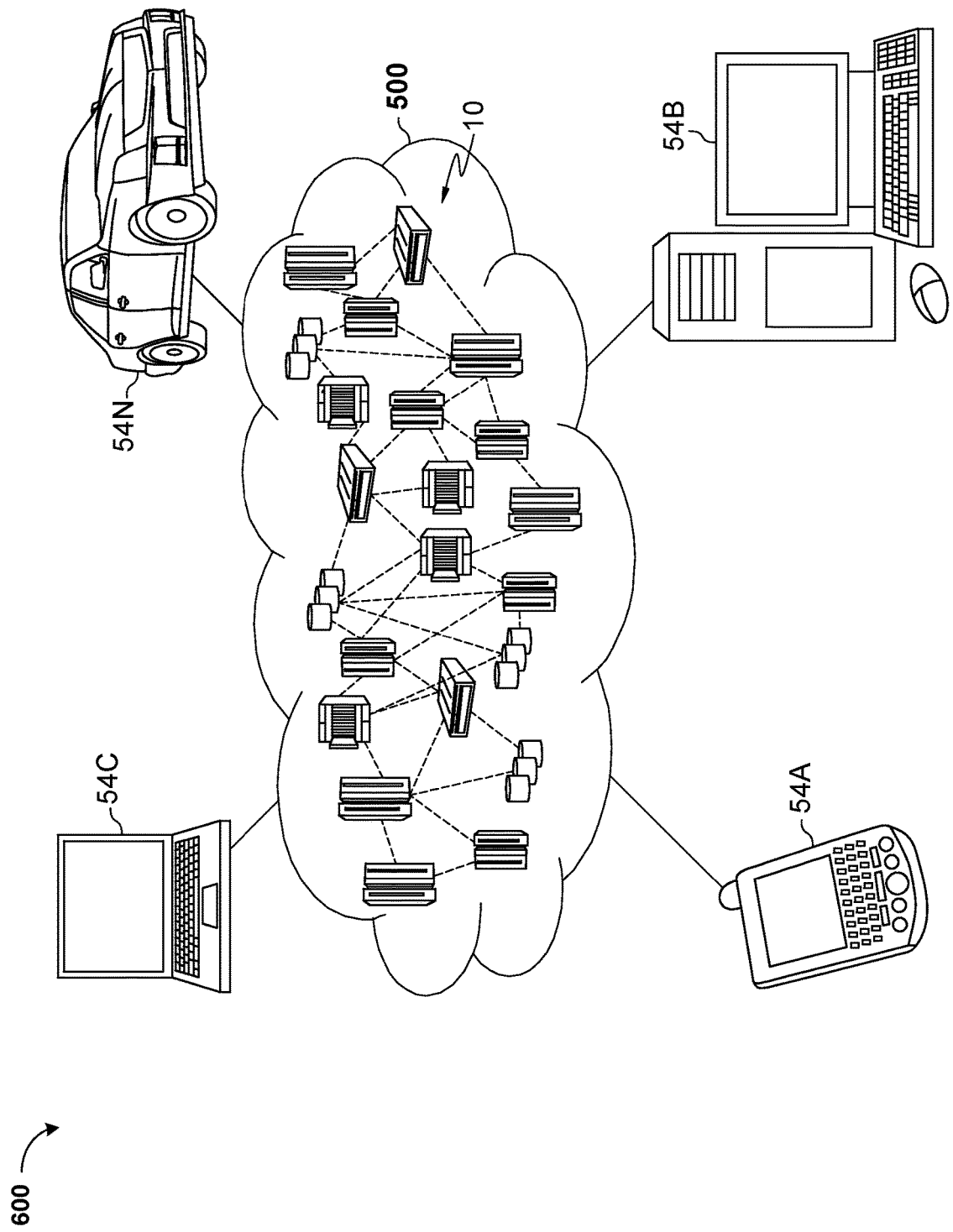
FIG. 6 is a block diagram of an illustrative cloud computing environment including the computer system depicted in FIG. 1, according to at least one embodiment.

Referring to FIG. 6, an illustrative cloud computing environment 600 is depicted which may be suitable for implementing certain embodiments of the disclosed subject matter. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
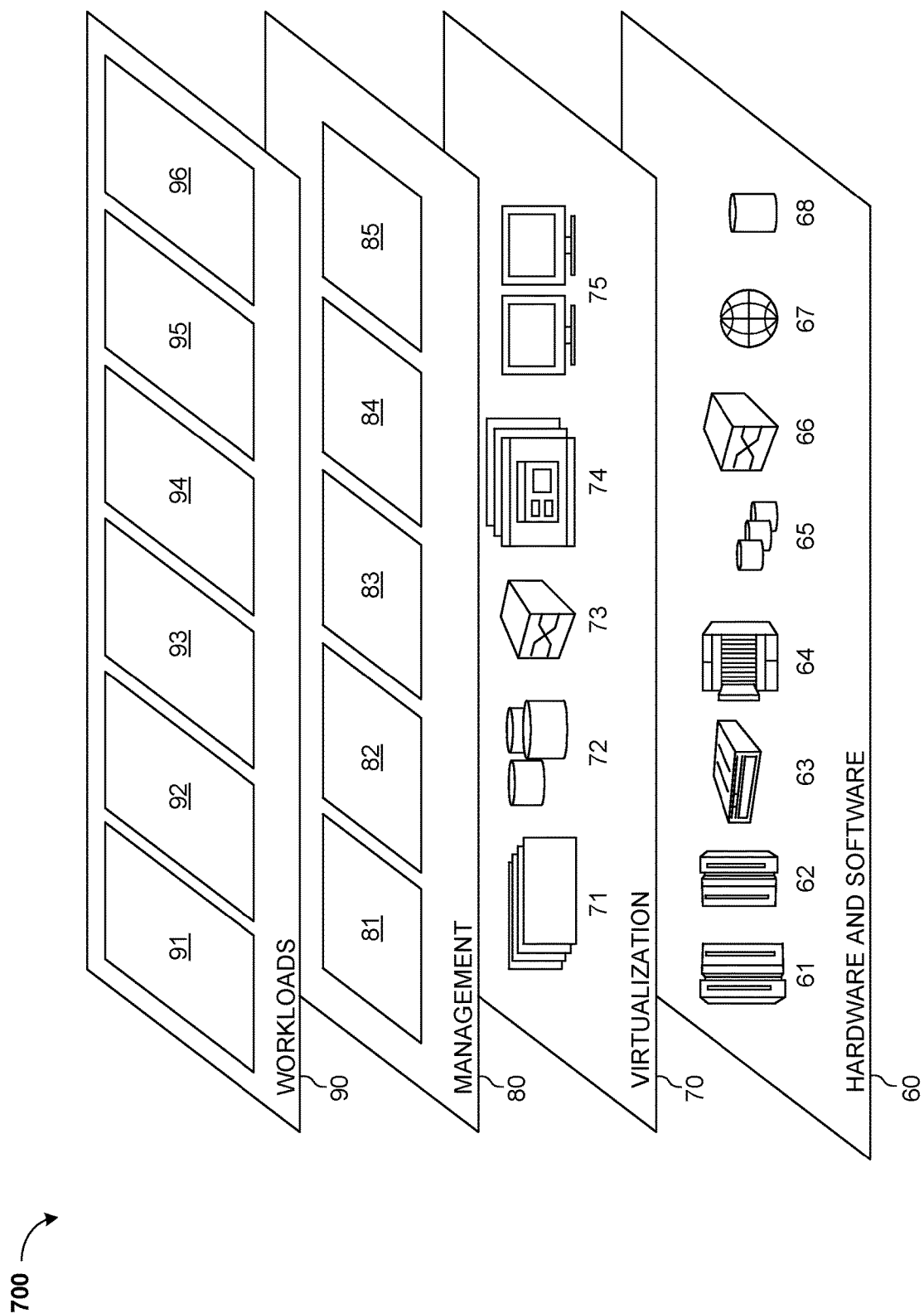
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video decoding using at least one processor, the method comprising:
    obtaining video data including a syntax element indicating a quantization index;
    parsing the syntax element to determine the quantization index;
    adding an offset value to the quantization index;
    obtaining a quantization step size from a lookup table based on the quantization index and the offset value; and
    decoding the video data based on the quantization step size,
    wherein based on the quantization index being smaller than a threshold value, the quantization step size based on a linear mapping with the quantization index and the offset value, and
    wherein based on the quantization index being larger than the threshold value, the quantization step size based on an exponential mapping with the quantization index and the offset value.

2. The method of claim 1, wherein the offset value is determined based on an internal bit depth value of the video data.

3. The method of claim 2, wherein the quantization step size is obtained from the lookup table based on a result of adding the offset value to the quantization index, if the quantization index is larger than the threshold value.

4. The method of claim 1, wherein the offset value is a negative integer.

5. The method of claim 1, wherein the threshold value is 255.

6. The method of claim 1, wherein the syntax element comprises a 9-bit integer.

7. The method of claim 1, wherein a value of the 9-bit integer is equal to a result of adding the offset value to the quantization index.

8. The method of claim 1, wherein a size of the lookup table is 255 values of the quantization step size.

9. A device for video decoding, the device comprising:
    at least one memory configured to store program code; and
    at least one processor configured to read the program code and operate as instructed by the program code, the program code including:
        first obtaining code configured to cause the at least one processor to obtain video data including a syntax element indicating a quantization index;
        parsing code configured to cause the at least one processor to parse the syntax element to determine the quantization index;
        adding code configured to cause the at least one processor to add an offset value to the quantization index;
        second obtaining code configured to cause the at least one processor to obtain a quantization step size from a lookup table based on the quantization index and the offset value; and
        decoding code configured to cause the at least one processor to decode the video data based on the quantization step size, wherein based on the quantization index being smaller than a threshold value, the quantization step size based on a linear mapping with the quantization index and the offset value, and wherein based on the quantization index being larger than the threshold value, the quantization step size based on an exponential mapping with the quantization index and the offset value.

10. The device of claim 9, wherein the offset value is determined based on the internal bit depth value of the video data.

11. The device of claim 10, wherein the quantization step size is obtained from the lookup table based on a result of adding the offset value to the quantization index, if the quantization index is larger than the threshold value.

12. The device of claim 9, wherein the offset value is a negative integer.

13. The device of claim 9, wherein the threshold value is 255.

14. The device of claim 9, wherein the syntax element comprises a 9-bit integer.

15. The device of claim 14, wherein a value of the 9-bit integer is equal to a result of adding the offset value to the quantization index.

16. The device of claim 9, wherein a size of the lookup table is 255 values of the quantization step size.

17. A non-transitory computer-readable medium storing instructions, the instructions comprising: one or more instructions that, when executed by one or more processors of a device for video decoding, cause the one or more processors to:

obtain video data including a syntax element indicating a quantization index;

parse the syntax element to determine the quantization index;

add an offset value to the quantization index;

obtain a quantization step size from a lookup table based on the quantization index and the offset value; and decode the video data based on the quantization step size, wherein based on the quantization index being smaller than a threshold value, the quantization step size based on a linear mapping with the quantization index and the offset value, and wherein based on the quantization index being larger than the threshold value, the quantization step size based on an exponential mapping with the quantization index and the offset value.

18. The non-transitory computer-readable medium of claim 17, wherein the offset value is determined based on a internal bit depth value of the video data.

19. The non-transitory computer-readable medium of claim 18, wherein the quantization step size is obtained from the lookup table based on a result of adding the offset value to the quantization index, if the quantization index is larger than the threshold value.

20. The non-transitory computer-readable medium of claim 17, wherein the syntax element comprises a 9-bit integer.

* * * * *